(12) United States Patent
Ando (10) Patent No.: US 12,545,222 B2
(45) Date of Patent: Feb. 10, 2026

(54) VEHICLE CONTROL SYSTEM

(71) Applicant: SUBARU CORPORATION, Tokyo (JP)

(72) Inventor: Yusuke Ando, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 153 days.

(21) Appl. No.: 18/386,304

(22) Filed: Nov. 2, 2023

(65) Prior Publication Data

US 2024/0182007 A1 Jun. 6, 2024

(30) Foreign Application Priority Data

Dec. 6, 2022 (JP) ................... 2022-195077

(51) Int. Cl.
*B60T 8/1755* (2006.01)
*B60T 8/1761* (2006.01)
*B60T 8/32* (2006.01)

(52) U.S. Cl.
CPC ...... *B60T 8/17558* (2013.01); *B60T 8/17616* (2013.01); *B60T 8/321* (2013.01); *B60T 2201/022* (2013.01)

(58) Field of Classification Search
CPC .. B60T 8/17558; B60T 8/17616; B60T 8/321; B60T 2201/022
See application file for complete search history.

(56) References Cited

FOREIGN PATENT DOCUMENTS

| JP | 2005067426 A | * | 3/2005 |
| JP | 2015-48006 A |   | 3/2015 |
| JP | 2015048006 A | * | 3/2015 |

OTHER PUBLICATIONS

English Machine Translation of JP-2015048006-A (Year: 2015).*
English Machine Translation of JP-2005067426-A (Year: 2005).*

* cited by examiner

*Primary Examiner* — Andrew J Cromer
(74) *Attorney, Agent, or Firm* — TROUTMAN PEPPER LOCKE LLP (57) ABSTRACT

A vehicle control system conducts contact avoidance brake control and electronic stability control on a vehicle using a braking unit. The vehicle control system includes one or more processors, and one or more storage media in which a program to be executed by the one or more processors is stored. The program includes one or more commands that are directed to cause the one or more processors to perform a skid prediction process and an enabling process based on a reference vehicle behavior and a control value of the contact avoidance brake control. The skid prediction process is adapted to predict whether the vehicle will exhibit a skid behavior during the contact avoidance brake control. The enabling process is adapted to enable the electronic stability control if the electronic stability control is in a disabled mode when it is predicted that the vehicle will exhibit the skid behavior.

12 Claims, 5 Drawing Sheets

VEHICLE CONTROL SYSTEM

CROSS-REFERENCE TO RELATED APPLICATION

The present application claims priority from Japanese Patent Application No. 2022-195077 filed on Dec. 6, 2022, the entire contents of which are hereby incorporated by reference.

BACKGROUND

The disclosure relates to a vehicle control system configured to execute contact avoidance brake control and electronic stability control of a vehicle using a braking unit that brakes the vehicle.

Contact avoidance brake control such as autonomous emergency braking (AEB) and skid prevention control such as electronic stability control (ESC) are known as vehicle control.

The term "contact avoidance brake control" used herein refers to control to avoid contact of a vehicle using a braking unit such as a brake mechanism. The contact avoidance brake control means control involving braking a vehicle to avoid contact of the vehicle in a broad sense and includes the AEB described above and brake control involving a steering operation to avoid contact, such as automatic emergency steering (AES).

The contact avoidance brake control can cause unwanted sudden braking or unwanted sudden spinning of the vehicle. In order to secure vehicle behavior stability, the contact avoidance brake control is executed when conditions for executing the contact avoidance brake control, including a condition that electronic stability control has been enabled, are satisfied.

However, if the condition that the electronic stability control has been enabled is set as one of the conditions for executing the contact avoidance brake control as described above, the contact avoidance brake control is disabled simply by disabling the electronic stability control, which is undesirable.

In a technique disclosed in Japanese Unexamined Patent Application Publication (JP-A) No. 2015-048006, the electronic stability control is enabled when a condition that the contact avoidance brake control has been activated is satisfied provided that the contact avoidance brake control is enabled even if the electronic stability control has been disabled. This helps to secure vehicle behavior stability during the contact avoidance brake control.

In other words, according to the technique disclosed in JP-A No. 2015-048006, the contact avoidance brake control is prevented from being disabled simply by disabling the electronic stability control, and vehicle behavior stability is secured during the contact avoidance brake control.

SUMMARY

An aspect of the disclosure provides a vehicle control system configured to conduct contact avoidance brake control and electronic stability control on a vehicle using a braking unit configured to brake the vehicle. The vehicle control system includes one or more processors, and one or more memories in which a program to be executed by the one or more processors is stored.

The program includes one or more commands. The one or more commands are directed to cause the one or more processors to perform a skid prediction process adapted to predict, based on a reference vehicle behavior of the vehicle at a start of the contact avoidance brake control and a control value of the contact avoidance brake control, whether the vehicle will exhibit a skid behavior during execution of the contact avoidance brake control, and an enabling process adapted to enable the electronic stability control if the electronic stability control is in a disabled mode when it is predicted in the skid prediction process that the vehicle will exhibit the skid behavior.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

In a technique disclosed in JP-A No. 2015-048006, electronic stability control is enabled when only a condition that the contact avoidance brake control has been activated is satisfied.

However, according to the technique disclosed in JP-A No. 2015-048006, the electronic stability control is enabled also at the occurrence of an erroneous operation of the contact avoidance brake control such as unwanted activation of the contact avoidance brake control. Enabling the electronic stability control in response to such an erroneous operation of the contact avoidance brake control can make the driver feel inconvenient.

This generates a need for an unwanted displaying operation to indicate an enabled mode of the electronic stability control, for example, making a driver who drives the vehicle feel inconvenient.

It is assumed that the electronic stability control is disabled by the driver during sport traveling such as circuit racing, for example. If an erroneous operation of the contact avoidance brake control occurs in such a case, the electronic stability control is unnecessarily enabled, resulting in poor drivability in sport traveling and making the driver feel inconvenient.

It is desirable to provide a vehicle control system that makes it possible to prevent the contact avoidance brake control from being disabled simply by disabling the electronic stability control and to secure vehicle behavior stability during the contact avoidance brake control with making the driver feel less inconvenience.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. As used herein, the term "collision" may be used interchangeably with the term "contact".

Figure 1:
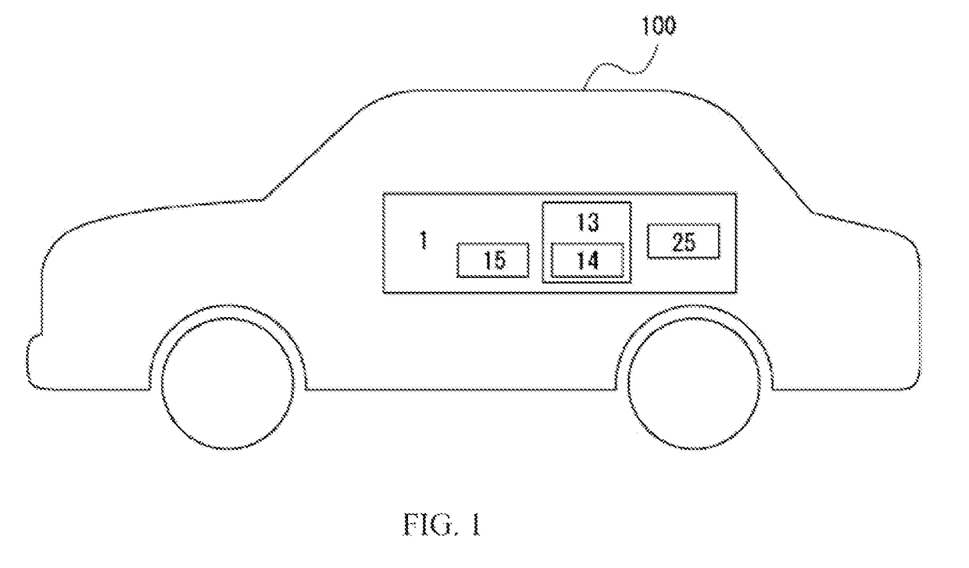
FIG. 1 is a schematic configuration of a vehicle including a vehicle control system according to one example embodiment of the disclosure.
Figure 2:
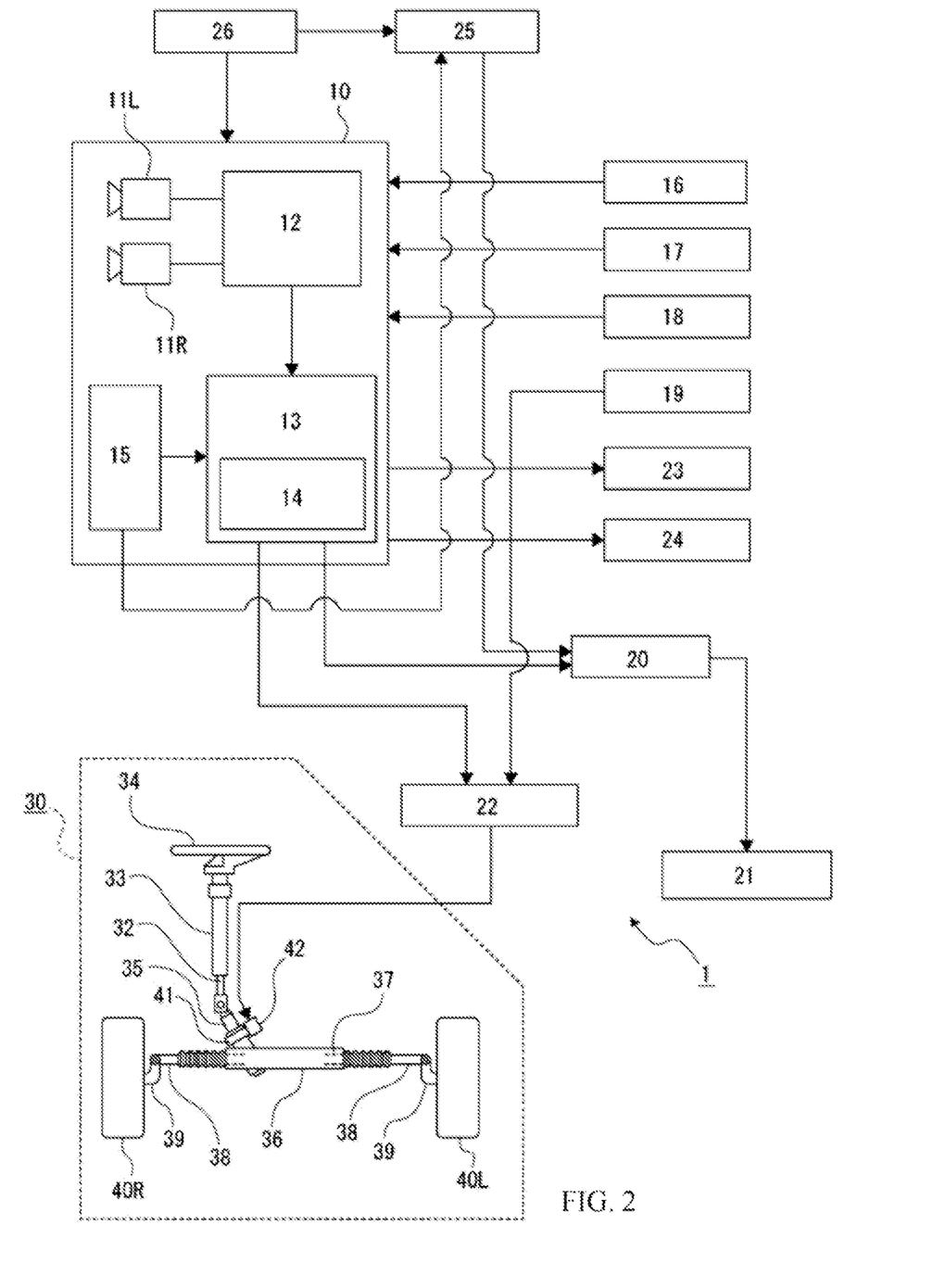
FIG. 2 is an explanatory diagram of an exemplary configuration of the vehicle control system according to one example embodiment of the disclosure.

FIG. 1 illustrates a schematic configuration of a vehicle 100 including a vehicle control system 1 according to an example embodiment of the disclosure. FIG. 2 illustrates an exemplary configuration of the vehicle control system 1 according to the example embodiment. FIG. 2 further illustrates an exemplary configuration of a steering mechanism 30 included in the vehicle 100 is also illustrated as well as the exemplary configuration of the vehicle control system 1.

In the example embodiment, the vehicle 100 may be a four-wheeled vehicle, for example. The vehicle 100 may include one or both of an engine and a traveling motor as a drive source or drive sources of the wheels. That is, the vehicle 100 may be an electric vehicle (EV) including only a traveling motor as a drive source of the wheels, a hybrid electric vehicle (HEV) including both of an engine and a traveling motor as drive sources of the wheels, or an engine vehicle including only an engine as a drive source of the wheels.

The vehicle 100 may include a non-illustrated braking unit that brakes the vehicle 100, and a steering unit (the steering mechanism 30 to be described later) that causes the vehicle 100 to turn in a desired direction.

The term "braking unit" used herein may refer to not only a brake mechanism such as a disk brake or a drum brake and also a configuration that performs brake control of the vehicle 100 using regenerative braking of the traveling motor in a broad sense in a case where the vehicle 100 is an EV or a HEV.

The term "steering unit" used herein may refer to a configuration (e.g., the steering mechanism 30) that causes the vehicle 100 to turn in any desired direction of right and left directions, in a broad sense.

The vehicle 100 may include a device that recognizes an external environment of the vehicle 100. In the example embodiment, the vehicle 100 may include an imaging device 10 that recognizes the external environment of the vehicle 100, for example. The imaging device 10 will be described later.

As illustrated in FIG. 1, the vehicle control system 1 of the vehicle 100 includes a prediction control processor 15 that performs control according to the example embodiment of the disclosure.

The vehicle control system 1 may further include a driver assistance control processor 13 that performs various kinds of driver assistance control. The driver assistance control processor 13 may include a contact avoidance control unit 14. As to be described later, the contact avoidance control unit 14 may conduct contact avoidance brake control on the vehicle 100. The term "contact avoidance brake control" used herein may refer to control to avid contact of the vehicle 100 using the braking unit such as the brake mechanism. The contact avoidance brake control may encompass various kinds of brake control that involve a braking operation to avoid contact of the vehicle 100, such as autonomous emergency braking (AEB), and various kinds of brake control that involve a steering operation to avoid contact of the vehicle 100, such as automatic emergency steering (AES).

The vehicle control system 1 may further include an electronic stability control (ESC) unit 25. The term "ESC" used herein may refer to control in which the vehicle 100 is maintained in a stable attitude so as not to cause a skid by the braking unit and an engine output (including a motor output in a case of the vehicle 100 including a traveling motor).

As illustrated in FIG. 2, the vehicle control system 1 may include a vehicle speed sensor 16, a motion sensor 17, an actual steering angle sensor 18, and a steering torque sensor 19 as sensors relating to the contact avoidance control.

The vehicle control system 1 may further include a display 23 and a sound generator 24 as devices relating to the contact avoidance control.

The vehicle speed sensor 16 may detect an own vehicle speed v which is a speed of the vehicle 100.

The motion sensor 17 may collectively refer to sensors, including a yaw rate sensor and an acceleration sensor, which detect motions of the vehicle 100.

The actual steering angle sensor 18 may detect actual cutting angles of steered wheels 40 (e.g., a right steered wheel 40R and a left steered wheel 40L to be described later) with respect to a longitudinal axis of the vehicle 100 as actual steering angles.

The steering torque sensor 19 may detect input torque to a steering shaft 32 to thereby detect a steering force (steering input torque) inputted by a driver who drives the vehicle 100 a steering wheel 34, for example.

The imaging device 10 may include imaging units 11R and 11L, an image processing unit 12, and the driver assistance control processor 13. The imaging units 11R and 11L may be disposed so as to capture an image of an environment in front of the vehicle 100 in a traveling direction.

To the imaging device 10, the vehicle speed sensor 16, the motion sensor 17, and the actual steering angle sensor 18 may be coupled. The image processing unit 12, the driver assistance control processor 13, and the prediction control processor 15 that are included in the imaging device 10 may be configured to receive detection signals from these sensors.

To the imaging device 10, an operation unit 26 may be coupled. The operation unit 26 may receive an operational input from the driver who drives the vehicle 100, for example. This enables the image processing unit 12, the driver assistance control processor 13, and the prediction control processor 15 to execute a process based on data on the operational input inputted by the driver with the operation unit 26, for example.

The imaging units 11R and 11L may be disposed in the vicinity of an upper portion of a windshield of the vehicle 100 at a predetermined interval in a vehicle width direction such that stereoscopic ranging is enabled, for example. The imaging units 11R and 11L may have respective optical axes parallel to each other, and respective focal lengths equal to each other. The imaging units 11R and 11L may further have respective frame periods synchronized with each other, and respective frame rates equal to each other.

Electric signals (captured image signals) acquired by imaging elements of the imaging units 11R and 11L may be each converted by an analog-to-digital (A/D) conversion into a digital image signal (captured image data) indicating a luminance value based on a predetermined grayscale and on a pixel unit basis. The captured image data may be color image data, for example.

The image processing unit 12 may include a microcomputer that includes a central processing unit (CPU), a read only memory (ROM), and a random access memory (RAM) serving as a work area, for example. The CPU may execute various processes according to programs stored in the ROM.

The image processing unit 12 may store each frame of the captured image data on the environment in front of the vehicle 100 acquired by the imaging units 11R and 11L in an internal memory. Thereafter, based on two frames of the captured image data, the image processing unit 12 may execute various processes to recognize the external environment of the vehicle 100. For example, the image processing unit 12 may perform a process adapted to recognize objects present in front of the vehicle 100, such as regulation lines (e.g., white lines or orange lines) on a road, preceding vehicles, pedestrians, obstacles, and various three-dimensional objects such as guardrails, curbs, or sidewalls that extend along a road.

The term "regulation lines" used herein may refer to lines that divide a traveling lane of the vehicle 100. Based on data on the recognized regulation lines, the image processing unit 12 may recognize the traveling lane of the vehicle 100 (hereinafter also referred to as an own vehicle traveling lane).

To recognize a three-dimensional object present in front of the vehicle 100, the image processing unit 12 may perform a process adapted to acquire distance data from a positional shift of an identical position (i.e., parallax) between a pair of the captured image data (i.e., a stereo image) acquired by the imaging units 11R and 11L based on a triangular ranging method. Based on the distance data, the image processing unit 12 may generate data indicating three-dimensional distance distribution (hereinafter referred to as distance image). Based on the distance image, the image processing unit 12 may perform a known grouping process to recognize regulation lines and three-dimensional objects such as guardrails, curbs, sidewalls, pedestrians, or vehicles, as described above.

The image processing unit 12 may store the position of the recognized three-dimensional object as three-dimensional object position data. The three-dimensional object position data may indicate the position of the recognized three-dimensional object as position coordinates on an x-z coordinate system having a z-axis in the longitudinal direction of the vehicle 100 and an x-axis in the lateral direction (vehicle width direction) of the vehicle 100. For example, the image processing unit 12 according to the example embodiment may store data on positions of right and left end points of a rear face of a three-dimensional object such as a preceding vehicle, a pedestrian, or an obstacle. The image processing unit 12 may further store a central position between the right and left end points of the rear face as data on a central position of the three-dimensional object.

Further, the image processing unit 12 may calculate and store data on a longitudinal distance dz, a longitudinal relative speed vrz, a longitudinal speed vz, and a longitudinal acceleration rate az of the recognized three-dimensional object. The longitudinal distance dz may be a distance to the three-dimensional object in the z-axis direction. The longitudinal relative speed vrz may be an amount of change in the longitudinal distance dz per unit time. The longitudinal speed vz may be calculated by adding the own vehicle speed v to the longitudinal relative speed vrz. The longitudinal acceleration rate az may be a differential value of the longitudinal speed vz.

Further, the image processing unit 12 may calculate and store data on a lateral distance dx, a lateral relative speed vrx, a lateral speed vx, and a lateral acceleration rate ax of the recognized three-dimensional object. The lateral distance dx may be a distance to the three-dimensional object in the x-axis direction. The lateral relative speed vrx may be an amount of change in the lateral distance dz per unit time. The lateral speed vx may be calculated by adding a lateral moving speed of the vehicle 100 to the lateral relative speed vrx. The lateral acceleration rate ax may be a differential value of the lateral speed vx.

Among the three-dimensional objects recognized as vehicles, the image processing unit 12 may recognize a vehicle traveling closest to the vehicle 100 on the own vehicle traveling lane in substantially the same direction as the vehicle 100 as a preceding vehicle. If a traveling speed of the preceding vehicle is about zero kilometers per hour, the image processing unit 12 may recognize the preceding vehicle as being stopped.

The information on the results of the image recognition, including the data on the position, speed, and acceleration rate of the three-dimensional object and the data on the own vehicle traveling lane, which are acquired by the image processing unit 12 as described above may be used in various kinds of driver assistance control.

Based on the information on the results of the image recognition by the image processing unit 12, the driver assistance control processor 13 may perform various kinds of driver assistance control.

The driver assistance control processor 13 may include the contact avoidance control unit 14. The contact avoidance control unit 14 may include a microcomputer that includes a CPU, a ROM, and a RAM, for example. The contact avoidance control unit 14 may execute various kinds of processes according to programs stored in the ROM.

In one example, the contact avoidance control unit 14 may perform processes relating to autonomous emergency braking (AEB) and automatic emergency steering (AES).

In the contact avoidance control as the AEB or the AES, the contact avoidance control unit 14 may calculate a risk evaluation value representing the degree of a risk of contact with an object based on the results of recognition of the external environment of the vehicle 100, and may determine a timing of braking intervention or a timing steering intervention based on the degree of the risk of contact represented by the risk evaluation value.

For example, the contact avoidance control unit 14 according to the example embodiment may calculate, as the risk evaluation value, time-to-contact (TTC) based on the longitudinal distance dz and the longitudinal relative speed vrz described above for each three-dimensional object recognized by the image processing unit 12. The TTC may be an index indicating how many seconds remain for contact if the current longitudinal relative speed vrz is maintained. For example, the TTC may be calculated by the following expression:

$$TTC = dz/vrz.$$

As the value of the TTC serving as the risk evaluation value decreases, the degree of the risk of contact may increase.

Based on the value of the TTC described above, the contact avoidance control unit 14 may determine whether there is a possible contact object in specific three-dimensional objects of interest among the three-dimensional objects recognized by the image processing unit 12. The term "possible contact object" used herein may refer to an object estimated to come into contact with the vehicle 100.

The term "specific three-dimensional objects of interest" used herein may refer to three-dimensional objects including movable creatures such as people and animals (hereinafter collectively referred to as movable objects). In this example, the term "specific three-dimensional objects of interest" may refer to three-dimensional objects including movable objects except the three-dimensional object recognized as the preceding vehicle. Accordingly, the three-dimensional objects subjected to the contact avoidance control may include guardrails, curbs, and sidewalls as described above.

In one example, the determination regarding the presence of the possible contact object may be performed based on the TTC according to the following procedure.

For example, the contact avoidance control unit 14 may determine whether the specific three-dimensional objects of interest include a three-dimensional object whose rate of overlapping with the vehicle 100 in the lateral direction is greater than or equal to a predetermined value and whose TTC is less than or equal to a predetermined threshold. If no appropriate three-dimensional object is present, the contact avoidance control unit 14 may determine that there is no possible contact object.

If only one appropriate three-dimensional object is found in the determination described above, the contact avoidance control unit 14 may determine the three-dimensional object to be the possible contact object. If multiple appropriate three-dimensional objects are found, the contact avoidance control unit 14 may determine a three-dimensional object having the smallest TTC value among the multiple three-dimensional objects to be the possible contact object, for example.

When the possible contact object is present, the contact avoidance control unit 14 may perform the AEB and, if needed, the AES with respect to the possible contact object. For example, the contact avoidance control unit 14 may start only the AEB first, and may perform, when it is determined that contact is unavoidable only by the AEB, the steering intervention by the conducting AES to avoid the contact while maintaining the braking by the AEB.

The prediction control processor 15 in the imaging device 10 may include a microcomputer that includes a CPU, a ROM, and a RAM, for example. The prediction control processor 15 may perform various kinds of processes according to programs stored in the ROM.

In the example embodiment, the prediction control processor 15 may perform a process adapted to predict a skid of the vehicle 100, and a process adapted to enable the ESC based on a result of the prediction of a skid of the vehicle 100, for example. Details of these processes according to the example embodiment will be described later.

The vehicle control system 1 may include a brake control unit 20 and a brake-related actuator 21 to achieve brake control of the vehicle 100.

The brake control unit 20 may include a microcomputer and may control various actuators provided as the brake-related actuator 21 based on a command from the driver assistance control processor 13 (including the contact avoidance control unit 14). Examples of the brake-related actuator 21 may include various kinds of brake-related actuators including a hydraulic control actuator that controls the hydraulic pressure of an output from a brake booster to a master cylinder and a hydraulic pressure inside a brake liquid pipe. The brake control unit 20 may perform the brake control of the vehicle 100 by controlling the hydraulic control actuator based on the command from the driver assistance control processor 13.

Upon the start of the AEB, the contact avoidance control unit 14 may send a brake command to the brake control unit 20 to brake the vehicle 100.

Upon the start of the AES, the contact avoidance control unit 14 may determine a target steering angle based on the results of the image recognition by the image processing unit 12. Thereafter, the contact avoidance control unit 14 may output a steering command current value determined based on the target steering angle to an electric power steering (EPS) control unit 22 to be described later.

The ESC unit 25 may be a control unit that achieves the electronic stability control. For example, the ESC unit 25 may include a microcomputer that includes a CPU, a ROM, and a RAM, and may achieve the electronic stability control by executing various kinds of processes according to programs stored in the ROM.

In this example, the ESC unit 25 may include various sensors, such as a wheel speed sensor and a yaw rate sensor, to be used in the electronic stability control. The CPU of the ESC unit 25 may achieve the electronic stability control by controlling the brake control unit 20 based on detection data acquired by these sensors.

To the ESC unit 25, the operation unit 26 may be coupled. In this example, the electronic stability control on the vehicle 100 may be enabled and disabled by the ESC unit 25 by operating the operation unit 26.

The ESC unit 25 may enable or disable the electronic stability control based on the operation of the operation unit 26.

The term "enabling" control used herein may refer to making the control executable (allowable to execute). The term "disabling" control used herein may refer to making the control inexecutable (unallowable to execute).

The driver assistance control processor 13 may further make various notifications relating the driver assistance to the driver who drives the vehicle 100. For example, the driver assistance control processor 13 may supply display information and sound generation command information to the display 23 and the sound generator 24.

The display 23 may collectively refer to a display control unit including a microprocessor, and a display device, for example. Examples of the display device may include various meters such as a speedometer or a tachometer provided in a meter panel disposed in front of the driver, a multi-function display (MFD), and other devices that present information to the driver. In the contact avoidance control, the display 23 may display a warning about danger of contact with an object or a visual indication that notifies the driver of a start or a stop of the AEB or AES. Further, the display 23 may display one or both of a notification that the electronic stability control by the ESC unit 25 has been enabled and a notification that the electronic stability control by the ESC unit 25 has been disabled.

The sound generator 24 may collectively refer to a sound control unit including a microcomputer, and a sound generation device such as an amplifier or a speaker, for example. In the contact avoidance control, the sound generator 24 may output a warning sound that notifies the driver of a start or a stop of the AEB or AES, for example.

The EPS control unit 22 may include a microcomputer, for example. The EPS control unit 22 may control an EPS motor 42 in the steering mechanism 30 based on the steering command current value sent from the contact avoidance control unit 14 in the driver assistance control processor 13 and the detection signal sent from the steering torque sensor 19.

Based on the data on the steering input torque inputted by the driver and acquired from the detection signal sent from the steering torque sensor 19, the EPS control unit 22 may determine a steering command current value to acquire steering assistance torque corresponding to the steering input torque. Based on the steering command current value, the EPS control unit 22 may drive the EPS motor 42. This achieves power steering control that assists the driver in performing a steering operation.

Note that the driver may be allowed to perform a steering operation during the execution of the steering control by the contact avoidance control unit 14. When a manual steering operation is performed during the steering control, the EPS control unit 22 may calculate the sum of the steering command current value sent from the contact avoidance control unit 14 and the steering command current value for the power steering control calculated as described above. Based on the sum of the current values, the EPS control unit 22 may drive the EPS motor 42.

The steering mechanism 30 to be subjected to the steering control may be configured as follows.

The steering mechanism 30 may have the steering shaft 32 rotatably supported by a non-illustrated vehicle body frame via a steering column 33. One end of the steering shaft 32 may extend toward a driver seat, and the steering wheel 34 may be attached to the end of the steering shaft 32. A pinion shaft 35 may be joined to the other end of the steering shaft 32.

The pinion shaft 35 may have a non-illustrated pinion engaged with a rack of a rack shaft 37 extending in a steering gear box 36 and supported by the steering gear box 36 in a reciprocally movable manner. A rack-and-pinion steering gear mechanism may be thereby configured.

Right and left ends of the rack shaft 37 may each project from the steering gear box 36. Respective tie rods 38 may be joined to the right and left ends of the rack shaft 37. A front knuckle 39 may be coupled to one end of each of the tie rods 38 opposite to the other end joined to the rack shaft 37. The front knuckles 39 may support the respective steered wheels 40 (the right steered wheel 40R and the left steered wheel 40L) and may be supported by the vehicle body frame via non-illustrated kingpins. The front knuckles 39 may be each coupled to an end of a corresponding one of the tie rods 38 so as to be rotatable about the kingpin.

Accordingly, when the steering shaft 32 and the pinion shaft 35 are rotated by operating the steering wheel 34, the rotation of the pinion shaft 35 may move the rack shaft 37 in a lateral direction. The lateral movement of the rack shaft 37 may rotate the front knuckle 39 about the kingpin, which steers the steered wheel 40R or 40L in the lateral direction.

The EPS motor 42 may be attached to the pinion shaft 35 via an assisting transmission mechanism 41. The EPS motor 42 may assist steering torque applied to the steering wheel 34 or may apply such steering torque that achieves a target steering angle.

According to the vehicle control system 1 of the example embodiment described above, the AEB control may be performed when the possible contact object is detected, and the steering intervention may be performed by the AES when it is determined that the contact is unavoidable only by the AEB that brakes the vehicle 100.

An exemplary procedure for the contact avoidance control described above will now be described with reference to the flowchart illustrated in FIG. 3, for confirmation.

Figure 3:
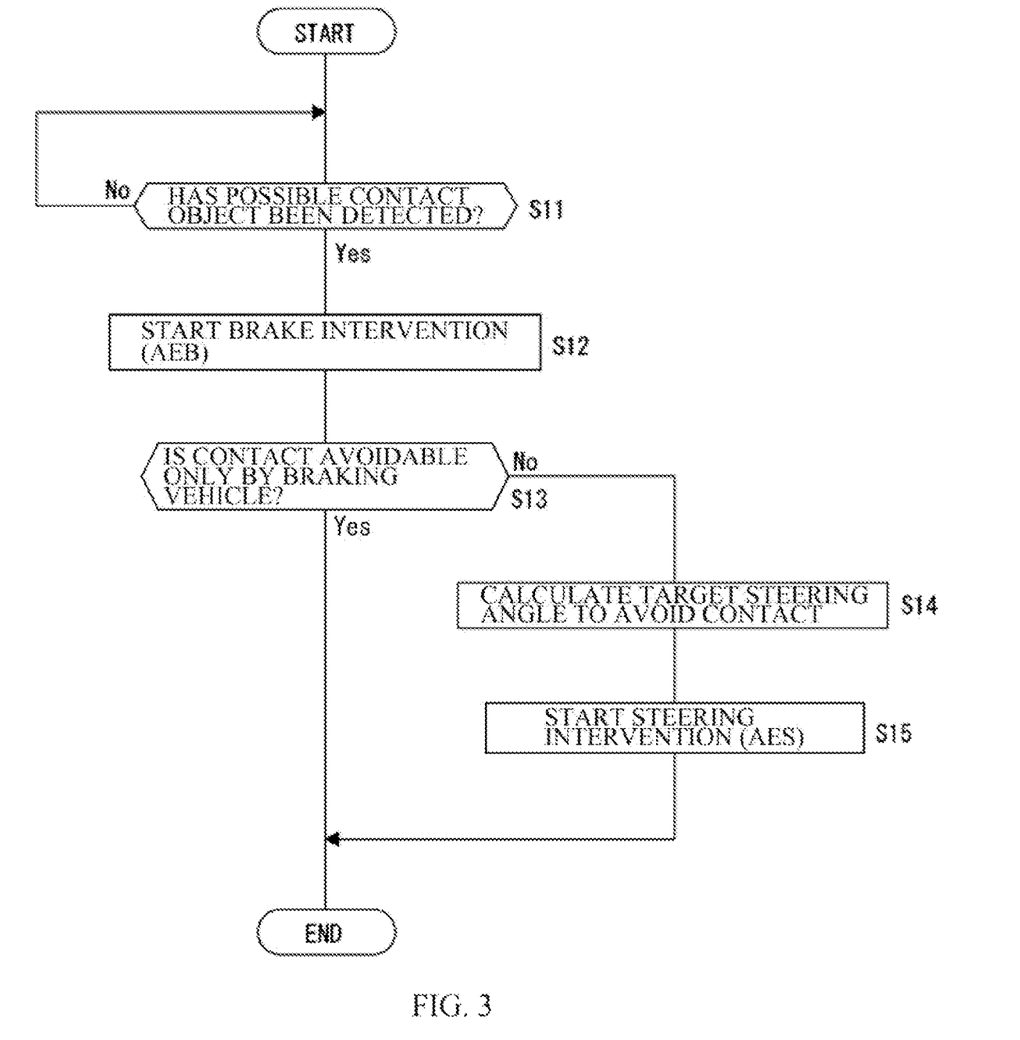
FIG. 3 is a flowchart of an exemplary procedure of contact avoidance control according to one example embodiment of the disclosure.

As illustrated in FIG. 3, the contact avoidance control unit 14 may first determine whether the possible contact object has been detected (Step S11). For example, using the method described above, the contact avoidance control unit 14 may determine whether there is a three-dimensional object satisfying the above-described conditions regarding the lap rate and the TTC in the three-dimensional objects recognized by the image processing unit 12. If it is determined that there is the three-dimensional object satisfying the conditions, the contact avoidance control unit 14 may determine that the possible contact object has been detected (Step S11: Yes). As described above, if there are multiple three-dimensional objects satisfying the conditions, the contact avoidance control unit 14 may select one of the three-dimensional objects as the possible contact object based on the values of the TTC.

Thereafter, in Step S12, the contact avoidance control unit 14 may start brake intervention. That is, the contact avoidance control unit 14 may start the AEB control. For example, the contact avoidance control unit 14 may send the brake control unit 20 a command to thereby start braking the vehicle 100 by the AEB.

Thereafter, in Step S13, the contact avoidance control unit 14 may determine whether the contact is avoidable only by braking the vehicle 100. The determination may be made by a known method, for example. In one example, the determination may be made based on the current longitudinal relative speed vrz of the possible contact object and map data indicating the TTC values adapted to avoid the contact and set for respective values of the longitudinal relative speed vrz.

If it is determined that the contact is avoidable only by braking the vehicle 100 (Step S13: Yes), the contact avoidance control unit 14 may end a series of processes illustrated in FIG. 3. That is, in this case, the contact may be avoided only by the AEB.

In contrast, it is determined that the contact is unavoidable only by braking the vehicle 100 (Step S13: No), the flow may proceed to Step S14. In Step S14, the contact avoidance control unit 14 may calculate a target steering angle adapted to avoid the contact. That is, the contact avoidance control unit 14 may calculate a target steering angle adapted to avoid contact with the object recognized as the possible contact object.

After calculating the target steering angle in Step S14, the contact avoidance control unit 14 may start steering intervention in Step S15. That is, the contact avoidance control unit 14 may start the AES control. For example, the contact avoidance control unit 14 may send the target steering angle adapted to avoid the contact to the EPS control unit 22 to thereby start the steering intervention to avoid the contact.

After performing the steering intervention in Step S15, the contact avoidance control unit 14 may end the series of processes illustrated in FIG. 3.

In some cases, it is desirable to disable the electronic stability control performed by the ESC unit 25. For example, it is desirable to disable the electronic stability control during sport traveling such as circuit traveling, or during escaping from a mud area or a snow area. Accordingly, it is effective that the vehicle control system 1 is configured to enable and disable the electronic stability control, as in this example embodiment.

As described above, the contact avoidance brake control such as the AEB can cause unwanted sudden braking or unwanted sudden spinning of the vehicle. One possible measure to secure behavior stability of the vehicle is to set a condition that the electronic stability control has been enabled as one of the conditions for activating the contact avoidance brake control. However, with such a measure, the contact avoidance brake control is also disabled simply by disabling the electronic stability control, which is undesirable.

One possible measure to prevent the contact avoidance brake control from being disabled simply by disabling the electronic stability control and to secure behavior stability of the vehicle during the contact avoidance brake control is to switch the electronic stability control in a disabled mode to an enabled mode in response to the activation of the contact avoidance brake control (refer to JP-A No. 2015-048006 described above, for example).

However, if the electronic stability control is configured to be enabled simply in response to the activation of the contact avoidance brake control, the electronic stability control is enabled even at the occurrence of an error operation such as unnecessary activation of the contact avoidance brake control. This can make the driver feel inconvenient.

To address such a concern, according to the example embodiment, the prediction control processor 15 performs control described below to prevent the contact avoidance brake control from being disabled simply by disabling the electronic stability control and to secure vehicle behavior stability during the contact avoidance brake control with making the driver feel less inconvenient.

Figure 4:
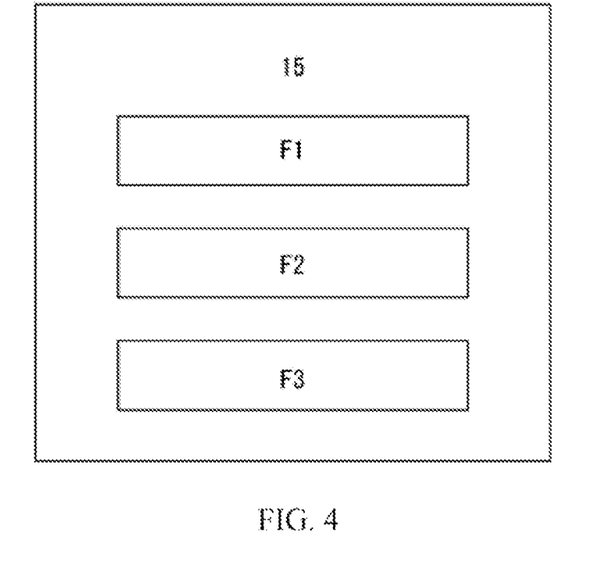
FIG. 4 is a block diagram for describing an exemplary operation of a prediction control processor according to one example embodiment of the disclosure.

FIG. 4 is a block diagram illustrating an operation of the prediction control processor 15 according to the example embodiment.

As illustrated in FIG. 4, the prediction control processor 15 may include a prediction processing unit F1, an enabling processing unit F2, and a post-enabling processing unit F3.

The prediction processing unit F1 may perform skid prediction to predict whether the vehicle 100 will exhibit a skid behavior during the contact avoidance brake control based on a reference vehicle behavior and a control value of the contact avoidance brake control. The reference vehicle behavior may be a behavior of the vehicle 100 at the start of the contact avoidance brake control.

When it is predicted by the prediction processing unit F1 that the vehicle 100 will exhibit the skid behavior, the enabling processing unit F2 switches the electronic stability control in the disabled mode to the enabled mode.

Even if the conditions for activating the contact avoidance brake control do not include the condition that the electronic stability control has been enabled, that is, even if it is configured to prevent the contact avoidance brake control from being disabled simply by disabling the electronic stability control, the electronic stability control is allowed to be enabled during the contact avoidance brake control owing to the provision of the prediction processing unit F1 and the enabling processing unit F2. This makes it possible to secure the vehicle behavior stability during the contact avoidance brake control. Further, it is possible to enable the electronic stability control only when it is predicted that the vehicle 100 will exhibit the skid behavior due to the contact avoidance brake control. This makes it possible to prevent the electronic stability control from being enabled at the occurrence of an error operation, such as unnecessary activation of the contact avoidance brake control.

In this example, the prediction processing unit F1 may perform the skid prediction based on a response characteristic of a braking unit with respect to brake control.

In the brake control, a time difference may be generated between an output of a control value of the brake control and actual generation of a braking force corresponding to the control value in response to the output of the control value. When the braking unit is configured by a braking mechanism, the time difference may be represented as a response time difference between an output of a control value of hydraulic pressure and actual generation of hydraulic pressure corresponding to the control value at a brake caliper, for example.

The skid prediction based on the response characteristic of the braking unit makes it possible to enable the electronic stability control at an appropriate timing and to improve the vehicle behavior stability during the contact avoidance brake control.

An example of the skid prediction performed by the prediction processing unit F1 will now be described.

First, the prediction processing unit F1 may estimate a behavior of the vehicle 100 in response to the start of the contact avoidance brake control. The estimation may correspond to the estimation of the reference vehicle behavior described above.

The behavior of the vehicle 100 estimated in this example may be a reference vehicle behavior for the determination as to whether the vehicle 100 will exhibit the skid behavior, such as a determination as to whether the vehicle 100 is making a turn or traveling straight, or a determination as to how fast the vehicle 100 is traveling. For example, the reference vehicle behavior for the determination as to whether the vehicle 100 will exhibit the skid behavior may be estimated based on data detected by the motion sensor 17 such as a yaw rate, a longitudinal acceleration rate, or a lateral acceleration rate of the vehicle 100, data on a vehicle speed detected by the vehicle speed sensor 16, or data on an actual steering angle detected by the actual steering angle sensor 18.

Based on the estimated reference vehicle behavior, the prediction processing unit F1 may acquire a threshold THr of a deceleration rate.

The threshold THr may refer to a deceleration rate threshold indicating the degree of the deceleration rate that causes the vehicle 100 exhibiting the reference vehicle behavior to exhibit a skid behavior. In other words, when the deceleration rate exceeds the threshold THr while the vehicle 100 is exhibiting the reference vehicle behavior, it may be predicted that the vehicle 100 will exhibit the skid behavior.

Examples of the method of determining the threshold THr based on the reference vehicle behavior may include a method that uses a table indicating a correspondence relation between the reference vehicle behavior and the threshold THr. In this method, thresholds THr corresponding to respective reference vehicle behaviors may be determined based on results of experiments or simulations, and a table indicating a correspondence relation between the respective reference vehicle behaviors and the thresholds THr may be prepared. The table may be stored in a storage device, such as the ROM of the prediction control processor 15, readable by the CPU of the prediction control processor 15 so that a corresponding threshold THr is retrievable from the table based on the reference vehicle behavior.

After the threshold THr is determined based on the reference vehicle behavior, the prediction processing unit F1 may estimate a future deceleration rate based on the control value calculated in the contact avoidance brake control and the response characteristic of the braking unit. The prediction processing unit F1 may perform the skid prediction based on a result of a comparison of the estimated deceleration rate with the threshold THr.

The skid prediction involving the estimation of the future deceleration rate using the threshold THr will now be described with reference to the future FIG. 5.

Figure 5:
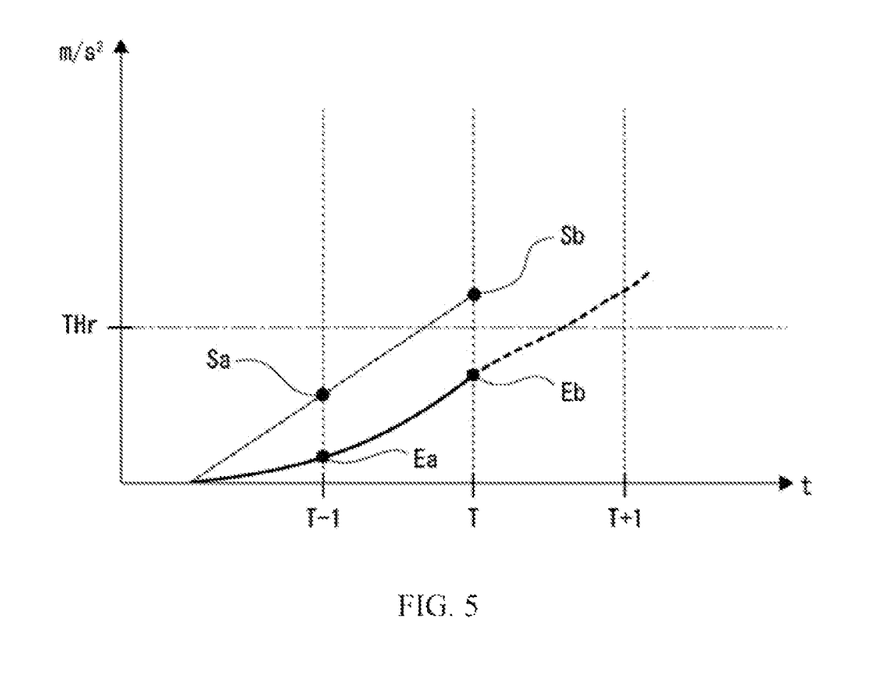
FIG. 5 is a graph for describing estimation of a future deceleration rate and skid prediction using a threshold according to one example embodiment of the disclosure.

In FIG. 5, a horizontal axis represents time t, and a vertical axis represents a deceleration rate (m/s$^2$, where "^" represents an exponential). In FIG. 5, a point (solid circle) denoted by a reference character starting with "S" may be a deceleration rate corresponding to a control value outputted in the contact avoidance brake control. Here, the control value outputted from the contact avoidance control unit 14 in the contact avoidance brake control is not necessarily a deceleration rate itself and may be a brake liquid pressure value other than the deceleration rate, for example. The deceleration rate denoted by the reference character starting with "S" (hereinafter referred to as a deceleration rate S) may be a deceleration rate corresponding to such a control value.

In the example illustrated in FIG. 5, a deceleration rate Sb and a deceleration rate Sa are illustrated as the deceleration rates S. The deceleration rate Sb may correspond to a control value outputted in a latest processing cycle (t=T), and the deceleration rate Sa may correspond to a control value outputted in the previous processing cycle (t=T−1).

In FIG. 5, a point denoted by a reference character starting with "E" represents a deceleration rate (hereinafter referred to as an estimated deceleration rate E) estimated based on the control value outputted in the contact avoidance brake control and the response characteristic of the braking unit. In the example illustrated in FIG. 5, an estimated deceleration rate Eb and an estimated deceleration rate Ea are estimated as the estimated deceleration rates E. The estimated deceleration rate Eb may be estimated based on the control value of the contact avoidance brake control outputted in the processing cycle T and the response characteristic of the braking unit. The estimated deceleration rate Ea may be estimated based on the control value of the contact avoidance brake control outputted in the previous processing cycle prior to the processing cycle T and the response characteristic of the braking unit.

If the response characteristic of the braking unit is known, a curve defined by the estimated deceleration rates E (i.e., data on the track of a temporal change of the estimated deceleration rate E) may be appropriately estimated as indicated by a thick line in FIG. 5, based on the response characteristic and the control value of the contact avoidance brake control.

Accordingly, the prediction processing unit F1 may estimate the future deceleration rate based on the control value of the contact avoidance brake control outputted in each processing cycle and the data on the response characteristic of the braking unit preliminarily stored. A curve indicated by a thick dotted line in FIG. 5 may be a curve defined by the estimated deceleration rate E estimated in the processing cycle T.

In this example, the prediction processing unit F1 may predict whether the vehicle 100 will exhibit the skid behavior based on the threshold THr and the curve defined by the estimated deceleration rates E estimated as described above. For example, the prediction processing unit F1 may determine whether the estimated deceleration rate E is greater than the threshold THr referring to the curve illustrated in FIG. 5.

If it is determined that the estimated deceleration rate E is greater than the threshold THr, the prediction processing unit F1 may determine that the vehicle 100 will exhibit the skid behavior. In contrast, if it is not determined that the estimated deceleration rate E is greater than the threshold THr, the prediction processing unit F1 may determine that the vehicle 100 will not exhibit the skid behavior.

The skid prediction regarding the vehicle 100 may be achieved by the method described above after the start of the contact avoidance brake control such as the AEB, for example.

Note that the method described above is a mere example and is not limited to a particular method. The method of the skid prediction may be modified in various ways.

For example, the skid prediction may be performed based on data on a road surface μ. The road surface μ may be estimated based on image analysis of images captured by one or both of the imaging units 11R and 11L or slip ratios of the wheels.

Alternatively, the skid prediction may be performed based on temperature (ambient temperature).

When the prediction processing unit F1 predicts that the vehicle 100 will exhibit the skid behavior in a state where the electronic stability control has been disabled, the enabling processing unit F2 illustrated in FIG. 4 may send a command to enable the electronic stability control to the ESC unit 25.

Accordingly, when it is predicted in the skid prediction that the vehicle 100 will exhibit the skid behavior after the contact avoidance brake control, such as the AEB, is started by the contact avoidance control unit 14, the electronic stability control may be enabled by the ESC unit 25. It is therefore possible to secure the behavior stability of the vehicle 100 in the contact avoidance brake control.

After the electronic stability control is enabled by the enabling processing unit F2, the post-enabling processing unit F3 may perform a process adapted to disable the electronic stability control.

In this example, the post-enabling processing unit F3 may perform a first post-enabling process adapted to disable the electronic stability control based on the result of estimation of the behavior of the vehicle 100 after the electronic stability control is enabled in the enabling process. For example, the post-enabling processing unit F3 in this example may estimate the behavior of the vehicle 100 based on an acceleration rate and a yaw rate detected by the motion sensor 17, data on a vehicle speed detected by the vehicle speed sensor 16, and data on an actual steering angle detected by the actual steering angle sensor 18 after the electronic stability control is enabled. In one example, the post-enabling processing unit F3 may estimate whether the behavior of the vehicle 100 has been stabilized. The phrase "the behavior of the vehicle 100 has been stabilized" may mean that the vehicle 100 is exhibiting a behavior unlikely to cause the skid behavior.

If it is estimated that the behavior of the vehicle 100 has been stabilized, the post-enabling processing unit F3 may send a command to disable the electronic stability control to the ESC unit 25.

As described above, when the electronic stability control is enabled by the enabling processing unit F2 in a state where the electronic stability control has been disabled, it is possible to return the electronic stability control to the disabled mode when it is estimated that the behavior of the vehicle 100 has been stabilized.

An exemplary procedure of the process adapted to achieve the behavior stabilization control according to the example embodiment described above will now be described with reference to a flowchart illustrated in FIG. 6.

Figure 6:
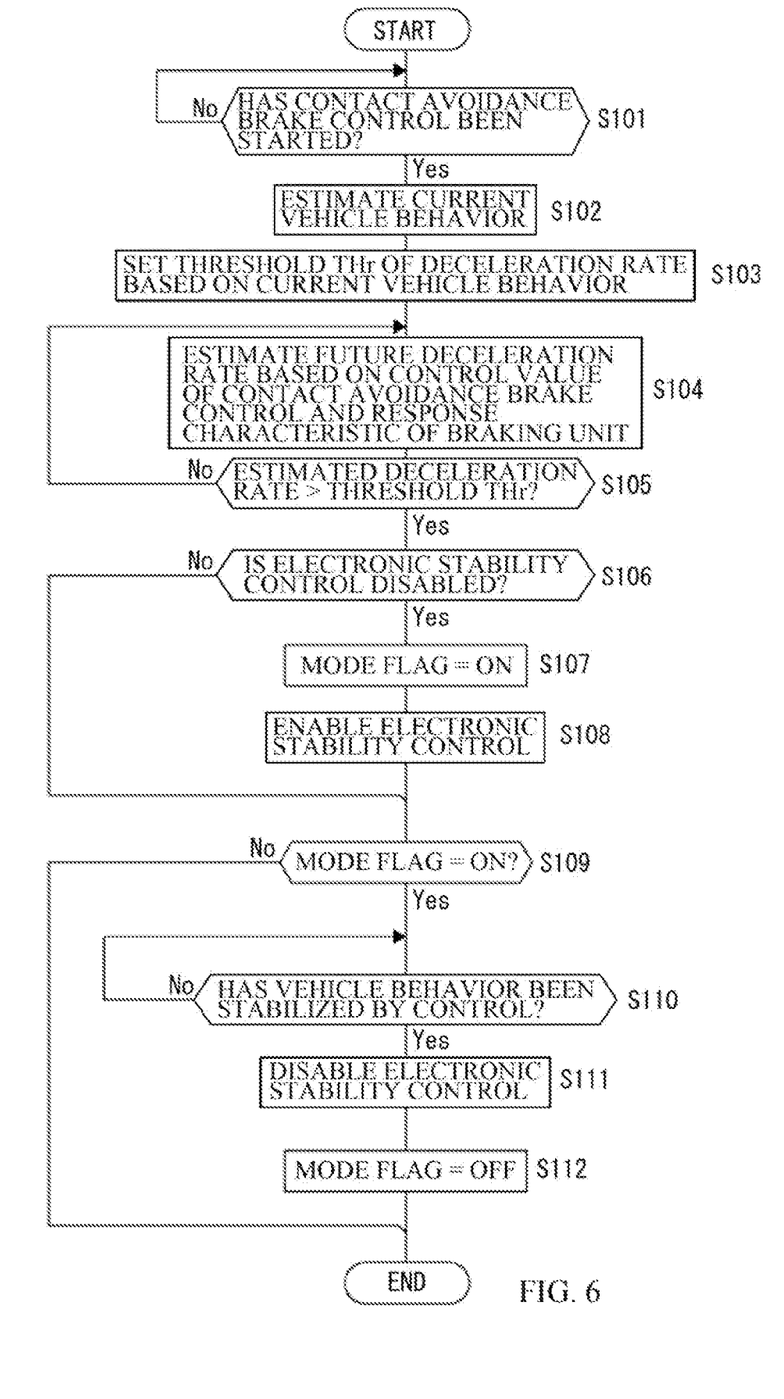
FIG. 6 is a flowchart of an exemplary procedure of a process adapted to implement behavior stabilization control according to one example embodiment of the disclosure.

The procedure illustrated in FIG. 6 may be executed by the CPU of the prediction control processor 15 according to a program stored in a memory such as the ROM of the prediction control processor 15, for example.

First, in Step S101, the prediction control processor 15 may wait for the start of the contact avoidance brake control. For example, the prediction control processor 15 may wait until the contact avoidance control unit 14 starts the contact avoidance brake control (corresponding to the start of the AEB in this example, as illustrated in Step S12 of FIG. 3).

When the contact avoidance brake control is started (Step S101: YES), the prediction control processor 15 may estimate a current vehicle behavior in Step S102. The estimation of the current vehicle behavior may correspond to the estimation of the reference vehicle behavior as described above. Note that examples of the method of estimating the reference vehicle behavior have been already described above and duplicated description thereof is avoided herein.

After Step S102, the prediction control processor 15 may acquire the threshold THr which is the deceleration rate determined based on the current vehicle behavior in Step S103. In this example, the threshold THr corresponding to the estimated vehicle behavior may be acquired referring to the table indicating the correspondence relation between vehicle behaviors and thresholds THr, as described above.

After Step S103, the prediction control processor 15 may estimate a future deceleration rate based on the control value of the contact avoidance brake control and the response characteristic of the braking unit in Step S104. For example, the prediction control processor 15 may estimate the future deceleration rate based on the control value of the contact avoidance brake control and the response characteristic of the braking unit by the method described above with reference to FIG. 5.

After Step S104, the prediction control processor 15 may determine whether the estimated deceleration rate is greater than the threshold THr in Step S105. The determination in Step S105 may correspond to the skid prediction described above. In this example, the prediction control processor 15 may determine whether the estimated deceleration rate E is greater than the threshold THr referring to the curve defined by the estimated deceleration rates E as described above.

If it is not determined that the estimated deceleration rate is greater than the threshold THr (Step S105: No), the prediction control processor 15 may cause the flow to return to Step S104. Accordingly, the estimation of the future deceleration rate based on the control value of the contact avoidance brake control and the response characteristic (Step S104), and the skid prediction based on the estimated deceleration rate and the threshold THr (Step S105) may be repeatedly performed in each processing cycle.

In contrast, if it is determined that the estimated deceleration rate is greater than the threshold THr (Step S105: Yes), the prediction control processor 15 may cause the flow to proceed to Step S106. In Step S106, the prediction control processor 15 may determine whether the electronic stability control is in the disabled mode. If it is determined that the electronic stability control is in the disabled mode (Step S106: Yes), the prediction control processor 15 may set a mode flag to ON in Step S107, following which the flow may proceed to Step S108. In Step S108, the prediction control processor 15 may enable the electronic stability control. For example, the prediction control processor 15 may send the command to enable the electronic stability control to the ESC unit 25.

After executing the process adapted to enable the electronic stability control in Step S108, the prediction control processor 15 may cause the flow to proceed to Step S109.

The mode flag may be a flag indicating whether the electronic stability control is in the disabled mode at the start of the contact avoidance brake control. The mode flag set to ON may indicate that the electronic stability control is in the disabled mode. A default value of the mode flag may be set to OFF.

In contrast, if it is not determined that the electronic stability control is in the disabled mode (Step S106: No), the prediction control processor 15 may cause the flow to skip Steps S107 and S108 and proceed to Step S109.

In Step S109, the prediction control processor 15 may determine whether the mode flag has been set to ON. If it is determined that the mode flag has been set to ON (Step S109: Yes), the prediction control processor 15 may cause the flow to proceed to Step S110. In Step S110, the prediction control processor 15 may wait until the vehicle behavior is stabilized by the control. For example, the prediction control processor 15 may continue to estimate whether the behavior of the vehicle 100 has been stabilized until it is estimated that the behavior of the vehicle 100 has been stabilized.

If it is estimated that the behavior of the vehicle 100 has been stabilized (Step S110: Yes), the prediction control processor 15 may cause the flow to proceed to Step S111. In Step S111, the prediction control processor 15 may disable the electronic stability control. Thereafter, in Step S112, the prediction control processor 15 may set the mode flag to OFF, following which a series of the processes illustrated in FIG. 6 may end.

In contrast, if it is not determined that the mode flag has been set to ON (Step S109: No), the series of the processes illustrated in FIG. 6 may end. For example, if the electronic stability control is in the enabled mode at the start of the contact avoidance brake control, the electronic stability control may be kept in the enabled mode during the execution of the contact avoidance brake control.

Although some example embodiments of the disclosure have been described above, the disclosure is not limited to the example embodiments described above, and various modification examples may be made.

For example, in the example embodiments described above, the post-enabling processing unit F3 may perform the first post-enabling process adapted to disable the electronic stability control when it is estimated that the behavior of the vehicle 100 has been stabilized after the electronic stability control is enabled. Alternatively, the post-enabling processing unit F3 may perform a second post-enabling process adapted to maintain the enabled mode of the electronic stability control until an operational input to instruct to disable the electronic stability control is performed.

If it is predicted that the vehicle 100 will exhibit the skid behavior in the contact avoidance brake control, it may be estimated that a skid is likely to be caused again upon the intervention of the contact avoidance brake control depending a surface condition of the road on which the vehicle 100 is traveling, for example. Accordingly, the electronic stability control may be maintained in the enabled mode even after the electronic stability control is enabled as described above. This makes it possible to improve the vehicle behavior stability.

Alternatively, the post-enabling processing unit F3 may disable the electronic stability control when the contact avoidance brake control ends.

Still alternatively, the post-enabling processing unit F3 may disable the electronic stability control based on a preset user setting (e.g., a setting for returning the electronic stability control to the disabled mode or a setting for maintaining the electronic stability control in the enabled mode) after the enabling process.

In the example embodiments described above, the process adapted to recognize the external environment of the vehicle 100 relating to the contact avoidance brake control may be performed based on the images captured by the camera. Alternatively, the process adapted to recognize the external environment of the vehicle 100 may be performed using a radar or a map locator, for example. In one example, an object which is present near the vehicle 100 may be recognized based on a vehicle position detected by a position sensor and a high-resolution map.

As described above, the vehicle control system according to the example embodiment of the disclosure (the vehicle control system 1) is configured to conduct the contact avoidance brake control and the electronic stability control on the vehicle (the vehicle 100) using the braking unit configured to brake the vehicle. The vehicle control system includes one or more processors (the CPU of the prediction control processor 15) and one or more memories (the ROM of the prediction control processor 15) in which a program to be executed by the one or more processors is stored.

The program includes one or more commands. The one or more commands are directed to cause the one or more processors to perform the skid prediction process adapted to predict, based on the reference vehicle behavior of the vehicle at a start of the contact avoidance control and the control value of the contact avoidance brake control, whether the vehicle 100 will exhibit the skid behavior during the execution of the contact avoidance brake control, and the enabling process adapted to enable the electronic stability control if the electronic stability control is in a disabled mode when it is predicted in the skid prediction process that the vehicle 100 will exhibit the skid behavior.

According to the configuration described above, the electronic stability control is allowed to be enabled during the contact avoidance brake control even if the conditions for activating the contact avoidance brake control do not include the condition that the electronic stability control has been enabled, that is, even if it is configured to prevent the contact avoidance brake control from being disabled simply by disabling the electronic stability control. This makes it possible to secure the vehicle behavior stability during the contact avoidance brake control. Further, according to the configuration described above, the electronic stability control is enabled only when it is predicted that the vehicle 100 will exhibit the skid behavior during the execution of the contact avoidance brake control. This makes it possible to prevent the electronic stability control from being enabled at the occurrence of an error operation such as unnecessary activation of the contact avoidance brake control.

Therefore, according to the example embodiment, it is possible to prevent the contact avoidance brake control from being disabled simply by disabling the electronic stability control and to secure the vehicle behavior stability during the contact avoidance brake control with making the driver feel less inconvenient.

Further, according to the vehicle control system of the example embodiment, the one or more processors are configured to predict the skid behavior of the vehicle in the skid prediction process, based on a response characteristic of the braking unit with respect to brake control.

Accordingly, the skid prediction may be performed based on the response characteristic of the braking unit, such as response time from an output of a control value of the brake control to actual generation of a hydraulic pressure corresponding to the control value at the brake caliper.

It is therefore possible to improve accuracy of the skid prediction and to enable the electronic stability control at an appropriate timing. This helps to improve the vehicle behavior stability during the contact avoidance brake control.

Further, according to the vehicle control system of the example embodiment, in the skid prediction process, the one or more processors are configured to acquire the threshold of a deceleration rate based on the reference vehicle behavior, estimate the future deceleration rate based on the control value of the contact avoidance brake control and the response characteristic, and predict the skid behavior of the vehicle based on the result of the comparison of the estimated future deceleration rate with the threshold.

Accordingly, the threshold of a deceleration rate, which indicates the degree of the deceleration rate that causes the vehicle exhibiting the reference vehicle behavior to exhibit a skid behavior, may be determined based on the information on the reference vehicle behavior indicating whether the vehicle is turning or traveling straight, or how fast the vehicle is traveling, for example.

Further, the skid behavior may be appropriately predicted by determining whether the future deceleration rate appropriately estimated based on the control value outputted in the contact avoidance brake control and the response characteristic of the braking unit is greater than the threshold.

It is therefore possible to improve accuracy of the skid prediction and enable the electronic stability control at an appropriate timing. This helps to improve the vehicle behavior stability during the contact avoidance brake control.

Further, according to the vehicle control system of the example embodiment, the one or more commands are directed to cause the one or more processors to execute the first post-enabling process adapted to disable the electronic stability control based on the result of the estimation of a behavior of the vehicle after the electronic stability control is enabled in the enabling process.

This helps to minimize the time in which the electronic stability control is being enabled against the driver's intention. Accordingly, it is possible to make the driver feel less uncomfortable.

Further, according to the vehicle control system of the example embodiment, the one or more commands are directed to cause the one or more processors to execute the second post-enabling process adapted to maintain the enabled mode of the electronic stability control until the operational input to instruct to disable the electronic stability control is performed after the electronic stability control is enabled in the enabling process.

If it is predicted that the vehicle will exhibit the skid behavior in the contact avoidance brake control, it may be estimated that a skid is likely to be caused again upon the intervention of the contact avoidance brake control depending on the surface condition of the road on which the vehicle is traveling. Accordingly, the electronic stability control may be maintained in the enabled mode even after the electronic stability control is enabled as described above.

Accordingly, it is possible to improve the vehicle behavior stability.

The prediction control processor 15 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the prediction control processor 15 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the prediction control processor 15 illustrated in FIG. 2.

The invention claimed is:

1. A vehicle control system configured to conduct contact avoidance brake control and electronic stability control on a vehicle, the vehicle control system comprising:
one or more processors; and
one or more memories configured to store a program to be executed by the one or more processors causing the one or more processors to:
receive a detection signal from one or more sensors;
determine a reference vehicle behavior of the vehicle at a start of the contact avoidance brake control based on the received detection signal;
perform a skid prediction process to:
acquire a threshold of a deceleration rate based on the reference vehicle behavior,
estimate a future deceleration rate based on a control value output in the contact avoidance brake control and a response characteristic with respect to the contact avoidance brake control, and
predict whether the vehicle will exhibit a skid behavior during execution of the contact avoidance brake control, based on (i) the reference vehicle behavior of the vehicle at a start of the contact avoidance brake control, (ii) a control value of the contact avoidance brake control, (iii) the response characteristic with respect to the contact avoidance brake control, and (iv) a result of a comparison of the future deceleration rate with the threshold; and
perform an enabling process to generate and transmit a command to enable the electronic stability control of the vehicle if the electronic stability control is in a disabled mode when it is predicted in the skid prediction process that the vehicle will exhibit the skid behavior, the electronic stability control of the vehicle performing a braking function on the vehicle to counteract the predicted skid behavior.

2. The vehicle control system according to claim 1, wherein the one or more processors are configured to execute a first post-enabling process to disable the electronic stability control based on a result of estimation of a behavior of the vehicle after the electronic stability control is enabled in the enabling process.

3. The vehicle control system according to claim 1, wherein the one or more processors are configured to execute a second post-enabling process to maintain an enabled mode of the electronic stability control until an operational input to instruct to disable the electronic stability control is performed after the electronic stability control is enabled in the enabling process.

4. The vehicle control system according to claim 1, wherein the reference vehicle behavior indicates at least one of whether the vehicle is making a turn, whether the vehicle is traveling straight, or a speed of the vehicle.

5. The vehicle control system according to claim 1, wherein the control value of the contact avoidance brake control indicates a deceleration rate.

6. The vehicle control system according to claim 1, wherein the threshold of the deceleration rate indicates a degree of the deceleration rate that causes the vehicle exhibiting the reference vehicle behavior to exhibit a skid behavior during the execution of the contact avoidance brake control.

7. The vehicle control system according to claim 1, wherein the one or more processors are configured to predict that the vehicle will exhibit the skid behavior during the execution of the contact avoidance brake control in response to the estimated future deceleration rate being greater than the threshold.

8. The vehicle control system according to claim 1, wherein the one or more processors are configured to execute a third post-enabling process to disable the electronic stability control based on a preset user setting after the electronic stability control is enabled in the enabling process.

9. The vehicle control system according to claim 1, wherein the one or more processors are configured to execute a fourth post-enabling process to maintain the enabled electronic stability control until the contact avoidance brake control is enabled.

10. The vehicle control system according to claim 1, wherein the response characteristic is a response time calculated from an output of the control value of the contact avoidance brake control to an actual generation of a brake control to be applied to the vehicle.

11. A vehicle control system configured to conduct contact avoidance brake control and electronic stability control on a vehicle, the vehicle control system comprising:
one or more processors; and
one or more memories configured to store a program to be executed by the one or more processors causing the one or more processors to:
receive a detection signal from one or more sensors;
determine a reference vehicle behavior of the vehicle at a start of the contact avoidance brake control based on the received detection signal;
perform a skid prediction process to predict, based on (i) the reference vehicle behavior of the vehicle at a start of the contact avoidance brake control, (ii) a control value of the contact avoidance brake control, and (iii) a response characteristic with respect to brake control, whether the vehicle will exhibit a skid behavior during execution of the contact avoidance brake control, the prediction being made by estimating a future deceleration rate of the vehicle based on the control value of the contact avoidance brake control and the response characteristic with respect to brake control; and
perform an enabling process to generate and transmit a command to enable the electronic stability control of the vehicle if the electronic stability control is in a disabled mode when it is predicted in the skid prediction process that the vehicle will exhibit the skid behavior, the electronic stability control of the vehicle performing a braking function on the vehicle to counteract the predicted skid behavior.

12. A vehicle control system configured to conduct contact avoidance brake control and electronic stability control on a vehicle, the vehicle control system comprising:
one or more processors; and
one or more memories configured to store a program to be executed by the one or more processors causing the one or more processors to:
receive a detection signal from one or more sensors;
determine a reference vehicle behavior of the vehicle at a start of the contact avoidance brake control based on the received detection signal;
perform a skid prediction process to predict, based on (i) the reference vehicle behavior of the vehicle at a start of the contact avoidance brake control and (ii) a response characteristic with respect to brake control, whether the vehicle will exhibit a skid behavior during execution of the contact avoidance brake control,
perform an enabling process to generate and transmit a command to enable the electronic stability control of the vehicle if the electronic stability control is in a disabled mode when it is predicted in the skid prediction process that the vehicle will exhibit the skid behavior, the electronic stability control of the vehicle performing a braking function on the vehicle to counteract the predicted skid behavior, and
execute a first post-enabling process to disable the electronic stability control based on a result of estimation of a behavior of the vehicle after the electronic stability control is enabled in the enabling process, the result of the estimation of the behavior of the vehicle indicating that the behavior of the vehicle has been stabilized after the electronic stability control is enabled in the enabling process.

* * * * *